US011293538B2

United States Patent
Inoue et al.

(10) Patent No.: US 11,293,538 B2
(45) Date of Patent: Apr. 5, 2022

(54) VEHICLE DRIVE DEVICE

(71) Applicant: AISIN CORPORATION, Kariya (JP)

(72) Inventors: Ryohei Inoue, Anjo (JP); Takahisa Hirano, Anjo (JP)

(73) Assignee: AISIN CORPORATION, Kariya (JP)

( * ) Notice: Subject to any disclaimer, the term of this patent is extended or adjusted under 35 U.S.C. 154(b) by 171 days.

(21) Appl. No.: 16/645,871

(22) PCT Filed: Nov. 14, 2018

(86) PCT No.: PCT/JP2018/042124
§ 371 (c)(1),
(2) Date: Mar. 10, 2020

(87) PCT Pub. No.: WO2019/098237
PCT Pub. Date: May 23, 2019

(65) Prior Publication Data
US 2020/0278020 A1 Sep. 3, 2020

(30) Foreign Application Priority Data
Nov. 17, 2017 (JP) .............................. JP2017-222312

(51) Int. Cl.
| F16H 37/08 | (2006.01) |
| F16H 57/021 | (2012.01) |
| H02K 11/21 | (2016.01) |
| B60K 1/00 | (2006.01) |
| B60K 17/16 | (2006.01) |
| F16H 57/037 | (2012.01) |
| H02K 7/00 | (2006.01) |
| H02K 7/116 | (2006.01) |

(Continued)

(52) U.S. Cl.
CPC ............. *F16H 57/021* (2013.01); *B60K 1/00* (2013.01); *B60K 17/16* (2013.01);
(Continued)

(58) Field of Classification Search
CPC .. F16H 57/021; F16H 37/0813; F16H 57/037; F16H 2057/02034;
(Continued)

(56) References Cited

U.S. PATENT DOCUMENTS

| 6,692,394 B2 * | 2/2004 | Takenaka ............ F16H 63/3416 |
| | | 475/5 |
| 8,636,091 B2 * | 1/2014 | Sanji ........................ B60K 6/48 |
| | | 180/65.235 |

(Continued)

FOREIGN PATENT DOCUMENTS

| DE | 19841159 A1 * | 1/2000 | ............. B60K 17/16 |
| DE | 102009036746 A1 * | 2/2011 | ........... F16H 57/021 |

(Continued)

OTHER PUBLICATIONS

Jan. 19, 2019 Search Report issued in International Patent Application No. PCT/JP2018/042124.

(Continued)

*Primary Examiner* — Sherry L Estremsky
(74) *Attorney, Agent, or Firm* — Oliff PLC

(57) ABSTRACT

A vehicle drive device including: a rotary electric machine that serves as a drive power source for a plurality of wheels; an input drivingly coupled to the rotary electric machine; a counter gear mechanism; a differential gear device that distributes a driving force transmitted from the rotary electric machine via the input and the counter gear mechanism, to the plurality of wheels; a case that accommodates the rotary electric machine, the input, the counter gear mechanism, and the differential gear device; and a support that is a separate member from the case, and is fixed inside the case.

18 Claims, 2 Drawing Sheets

(51) Int. Cl.
*H02K 24/00* (2006.01)
*F16H 57/02* (2012.01)

(52) U.S. Cl.
CPC ....... *F16H 37/0813* (2013.01); *F16H 57/037* (2013.01); *H02K 7/006* (2013.01); *H02K 7/116* (2013.01); *H02K 11/21* (2016.01); *H02K 24/00* (2013.01); *F16H 2057/02034* (2013.01)

(58) Field of Classification Search
CPC ............ F16H 2057/0216; H02K 11/21; H02K 7/006; H02K 7/116; H02K 24/00; B60K 1/00; B60K 17/16
See application file for complete search history.

(56) References Cited

U.S. PATENT DOCUMENTS

| | | | | |
|---|---|---|---|---|
| 9,631,706 | B2* | 4/2017 | Kato | ................. F16H 3/66 |
| 10,539,225 | B2* | 1/2020 | Nakano | ............... F16H 57/0423 |
| 2012/0286607 | A1* | 11/2012 | Shimizu | .............. F16H 57/0476 310/90 |
| 2019/0017576 | A1* | 1/2019 | Sugiura | ................... F16H 3/663 |

FOREIGN PATENT DOCUMENTS

| | | | | |
|---|---|---|---|---|
| EP | 2 602 515 | A1 | | 6/2013 |
| FR | 2832481 | A1 | * | 5/2003 ............. F16C 19/54 |
| JP | H09-175349 | A | | 7/1997 |
| JP | 2001-190042 | A | | 7/2001 |
| JP | 2009-254149 | A | | 10/2009 |
| JP | 2013-174300 | A | | 9/2013 |
| JP | 2015101277 | A | * | 6/2015 |

OTHER PUBLICATIONS

Aug. 4, 2020 Search Report issued in European Patent Application No. 18879534.8.

* cited by examiner

VEHICLE DRIVE DEVICE

BACKGROUND

The present disclosure relates to a vehicle drive device including a rotary electric machine, an input member, a counter gear mechanism, a differential gear device, and a case accommodating these components.

One known technique for a vehicle drive device is disclosed in, for example, Japanese Unexamined Patent Application Publication No. 9-175349 (JP 9-175349A) (Patent Document 1). A case (case 90) of a vehicle drive device of JP 9-175349A is divided into four parts in the axial direction.

If a peripheral wall portion of the case surrounding the outer side of a rotary electric machine (motor M), a counter gear mechanism (counter gear mechanism G), and a differential gear device (differential device D) in the radial direction is divided into a plurality of parts in the axial direction, it is necessary to provide bosses projecting radially outward for joining these parts of the peripheral wall portion to each other by a bolt or the like, and to provide a seal member for preventing oil leakage from the case at the joining portion. As the number of parts into which the peripheral wall portion is divided in the axial direction increases, the more bosses and seal members are needed. This may result in an increase in the size of the case, and an increase in production costs.

SUMMARY

It is therefore desired to implement a vehicle drive device that allows a reduction in the size of a case and a reduction in production costs.

In view of the above, there is provided a vehicle drive device including: a rotary electric machine that serves as a drive power source for a plurality of wheels; an input drivingly coupled to the rotary electric machine; a counter gear mechanism; a differential gear device that distributes a driving force transmitted from the rotary electric machine via the input and the counter gear mechanism, to the plurality of wheels; a case that accommodates the rotary electric machine, the input, the counter gear mechanism, and the differential gear device; and a support that is a separate member from the case, and is fixed inside the case; wherein the rotary electric machine and the input are disposed on a first axis; wherein the counter gear mechanism is disposed on a second axis different from the first axis; wherein the differential gear device is disposed on a third axis that is different from the first axis and the second axis; wherein a side on which the input is disposed with respect to the rotary electric machine in an axial direction is defined as an axial first side, and a side opposite to the axial first side is defined as an axial second side; wherein the case includes a tube peripheral wall surrounding an outer side of the rotary electric machine, the input the counter gear mechanism, and the differential gear device in a radial direction, a first side wall disposed on the axial first side with respect to the peripheral wall, and a second side wall disposed on the axial second side with respect to the peripheral wall; wherein the peripheral wall includes a first peripheral wall, and a second peripheral wall joined to the first peripheral wall from the axial second side; and wherein an axial first-side end of the counter gear mechanism is supported by the first side wall, and an axial second-side end of the counter gear mechanism is supported by the support.

With this configuration, since the support for supporting an end of the counter gear mechanism is provided, and since the support is fixed inside the case, it is possible to minimize the number of parts into which the peripheral wall of the case is divided. Accordingly, it is possible to minimize the number of bosses for joining the peripheral walls, and the number of seal members for preventing oil leakage from the inner side of the peripheral walls. As the number of bosses is reduced, the number of portions projecting radially outward can be reduced. Therefore, the size of the case can be reduced, and the configuration of the case can be simplified, which allows a reduction in production costs. A reduction in the number of seal members also allows a reduction in production costs. Accordingly, this configuration allows a reduction in the size of the case and a reduction in production costs.

DETAILED DESCRIPTION OF EMBODIMENTS

Figure 1:
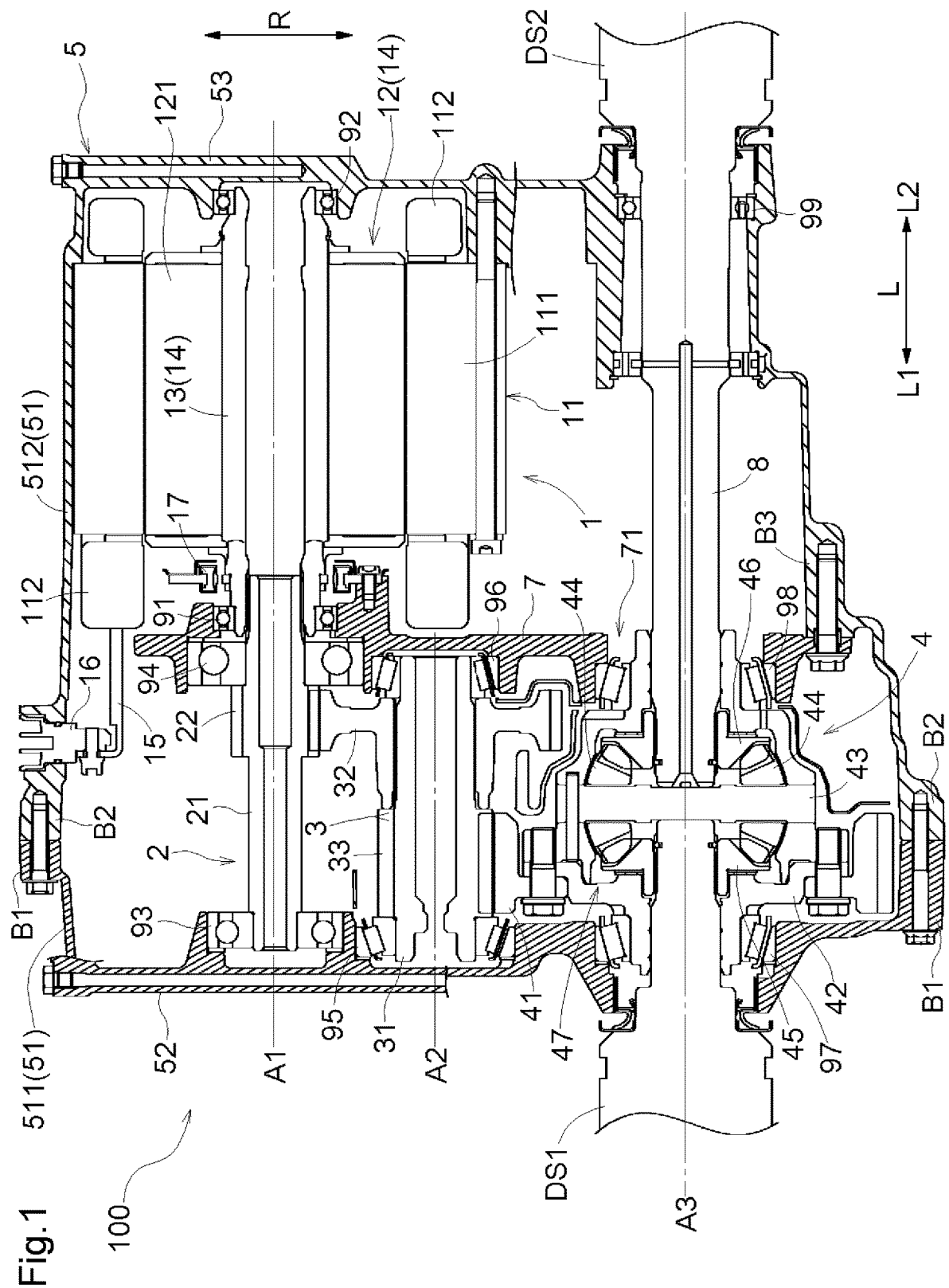
FIG. 1 illustrates a vehicle drive device according to an embodiment.

Hereinafter, an embodiment of a vehicle drive device 100 will be described with reference to the drawings. The vehicle drive device 100 is a drive device mounted on, for example, a hybrid vehicle that includes an internal combustion engine and a rotary electric machine as drive power sources for a plurality of wheels, and an electric vehicle that includes a rotary electric machine as a drive power source for a plurality of wheels. In the present embodiment, as illustrated in FIG. 1, the vehicle drive device 100 includes only a rotary electric machine 1 as a drive power source for a first wheel and a second wheel. In the case where the vehicle drive device 100 is applied to a two-wheel-drive four-wheeled vehicle, the vehicle can be implemented as an electric vehicle. In the case of a four-wheel-drive four-wheeled vehicle, the vehicle can be implemented as a hybrid vehicle by driving the other two wheels with a driving force of an engine. As a matter of course, in the case of a four-wheel-drive four-wheeled vehicle, the vehicle can be implemented as a four-wheel-drive electric vehicle by applying another vehicle drive device 100 of the present disclosure to the other two wheels.

The term "rotary electric machine" as used herein refers to any of a motor (electric motor), a generator (electric generator), and a motor generator that serves as both a motor and a generator as necessary. Further, the term "drivingly coupled" as used herein refers to a state in which two rotary elements are coupled to each other in such a manner that allows transmission of a driving force, including a state in which the two rotary elements are coupled to each other to rotate together, and a state in which the two rotary elements are coupled to each other via one or a plurality of transmission members in such a manner that allows transmission of a driving force. Examples of such transmission members include various types of members that transmit rotation while maintaining the same speed or changing the speed, such as a shaft, a gear mechanism, a belt, and a chain. Examples of such transmission members may further include an engagement device that selectively transmits rotation and a driving force, such as a friction engagement device and a meshing type engagement device.

As illustrated in FIG. 1, the vehicle drive device 100 includes: a rotary electric machine 1 that serves as a drive power source for the first wheel and the second wheel; an input member 2 (input) drivingly coupled to the rotary electric machine 1; a counter gear mechanism 3; a differential gear device 4 that distributes a driving force transmitted from the rotary electric machine 1 via the input member 2 and the counter gear mechanism 3, to the first wheel and the second wheel; and a case 5 that accommodates the rotary electric machine 1, the input member 2, the counter gear mechanism 3, and the differential gear device 4.

The rotary electric machine 1 and the input member 2 are disposed on a first axis A1 as their rotation axis; the counter gear mechanism 3 is disposed on a second axis A2 as its rotation axis; and the differential gear device 4 is disposed on a third axis A3 as its rotation axis. The first axis A1, the second axis A2, and the third axis A3 are virtual axes different from each other and are disposed parallel to each other.

In the following description, the direction parallel to the axes A1 to A3 is referred to as an "axial direction L" of the vehicle drive device 100. The side on which the input member 2 is disposed with respect to the rotary electric machine 1 in the axial direction L is referred to as an "axial first side L1", and the side on which the rotary electric machine 1 is disposed with respect to the input member 2 is referred to as an "axial second side L2". The direction orthogonal to each of the first axis A1, the second axis A2, and the third axis A3 is referred to as a "radial direction R" with reference to that axis. The radial direction with reference to each axis may be referred to simply as a "radial direction R" when it is not necessary to specify the axis to be referenced or when it is obvious which axis is referenced. In FIG. 1, the radial direction R with reference to the first axis A1 is illustrated. The direction of each member indicates the direction thereof when that member is assembled in the vehicle drive device 100.

Figure 2:
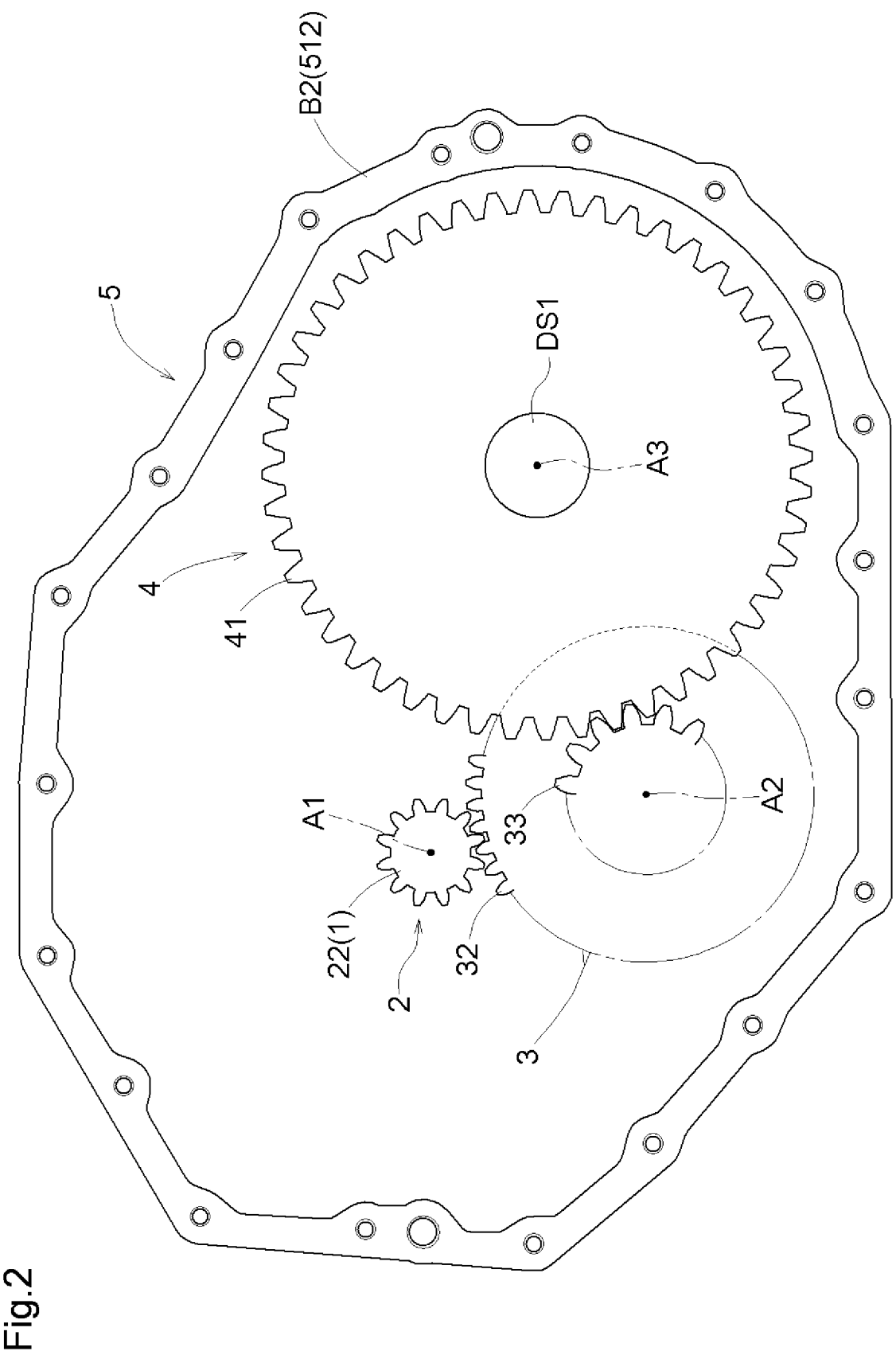
FIG. 2 illustrates first, second, and third axes according to the present embodiment.

As illustrated in FIGS. 1 and 2, the case 5 accommodates therein the rotary electric machine 1, the input member 2, the counter gear mechanism 3, and the differential gear device 4. The case 5 includes a peripheral wall portion 51 (peripheral wall) surrounding the outer side of these components in the radial direction R. Also, as illustrated in FIG. 1, the case 5 includes a first side wall portion 52 (first side wall) and a second side wall portion 53 (second side wall), each extending in the radial direction R. The first side wall portion 52 is disposed on the axial first side L1 with respect to the peripheral wall portion 51, the input member 2, and the counter gear mechanism 3. The second side wall portion 53 is disposed on the axial second side L2 with respect to the peripheral wall portion 51 and the rotary electric machine 1. The vehicle drive device 100 further includes a support member 7 (support) that is a separate member from the case 5, in addition to the case 5. The support member 7 is disposed between the first side wall portion 52 and the second side wall portion 53 in the axial direction L. The support member 7 is disposed inside the case 5, and is fixed to the case 5. In the present embodiment, the support member 7 is formed in a plate-like shape extending in the radial direction R. The inner space of the case 5 formed between the first side wall portion 52 and the second side wall portion 53 is divided by the support member 7. The space between the first side wall portion 52 and the support member 7 accommodates the main part of the input member 2, the counter gear mechanism 3, and the main part of the differential gear device 4. In contrast, the space between the second side wall portion 53 and the support member 7 accommodates the rotary electric machine 1. In FIG. 1, only the cross-sections of the case 5 and the support member 7 are indicated by hatching.

The rotary electric machine 1 is a drive power source for the first wheel and the second wheel. The rotary electric machine 1 includes a stator 11 and a rotor 12. The stator 11 includes a cylinder-like stator core 111 fixed to the case 5. The rotor 12 includes a cylinder-like rotor core 121 that is rotatable with respect to the stator 11. In the present embodiment, the rotary electric machine 1 is a rotating-field rotary electric machine. Accordingly, a coil 112 is wound around the stator core 111, and the rotor core 121 is provided with permanent magnets. Further, in the present embodiment, the rotary electric machine 1 is an inner rotor type electric machine. Accordingly, the rotor core 121 is disposed on the inner side of the stator core 111 in the radial direction R. Further, a cylinder-like rotor shaft 13 extending in the axial direction L is coupled to the inner peripheral surface of the rotor core 121. In this disclosure, "cylinder-like" means that the rough shape of something is a cylinder as a whole even if it has a portion that is deformed a little (the same applies to other expressions hereinafter with "-like" that are used to indicate shapes or the like).

The rotor shaft 13 rotates about the first axis A1, together with the rotor 12. The rotor shaft 13 extends in the axial direction L so as to project from both end faces of the rotor core 121 in the axial direction L. An axial first-side-L1 end of the rotor shaft 13 is rotatably supported by the support member 7 via a first rotor bearing 91. An axial second-side-L2 end of the rotor shaft 13 is rotatably supported by the second side wall portion 53 of the case 5 via a second rotor bearing 92. The input member 2 is coupled to the rotor shaft 13 such that the rotor shaft 13 and the input member 2 rotate together. Note that the rotor 12 and the rotor shaft 13 correspond to a rotary member 14 of the rotary electric machine 1, and an axial first-side-L1 end of the rotary member 14 is rotatably supported by the support member 7 via the first rotor bearing 91.

The input member 2 is drivingly coupled to the rotary electric machine 1. Then, the input member 2 rotates about the first axis A1, together with the rotor shaft 13 of the rotary electric machine 1. That is, the rotary electric machine 1 and the input member 2 are disposed on the first axis A1. The input member 2 includes a shaft portion 21 and a drive gear 22.

The shaft portion 21 is formed in a cylinder-like shape, and extends in the axial direction L. An axial second-side-L2 end of the shaft portion 21 is coupled to the axial first-side-L1 end of the rotor shaft 13. In the present embodiment, the axial second-side-L2 end of the shaft portion 21 is inserted into the axial first-side-L1 end of the rotor shaft 13 such that the shaft portion 21 is disposed on the inner side of the rotor shaft 13 in the radial direction R. These ends are coupled by spline engagement. An axial first-side-L1 end of the shaft portion 21 is rotatably supported by the first side wall portion 52 of the case 5 via a first input bearing 93. A part of the shaft portion 21 on the axial first side L1 with respect to the portion joined to the rotor shaft 13 is rotatably supported by the support member 7 via a second input bearing 94. Since the shaft portion 21 is rotatably supported by the first side wall portion 52 and the support member 7 in the manner described above, an axial first-side-L1 end of the input member 2 is rotatably supported by the first side wall portion 52, and an axial second-side-L2 end of the input member 2 is rotatably supported by the support member 7.

The drive gear 22 is a gear that transmits the driving force of the rotary electric machine 1 to the counter gear mechanism 3. The drive gear 22 is disposed on the shaft portion 21. The drive gear 22 is disposed between the first input bearing 93 and the second input bearing 94. In the present embodiment, the drive gear 22 is disposed adjacent to the axial second side L2 of the first input bearing 93. In the present embodiment, the drive gear 22 is formed integrally with the shaft portion 21.

The counter gear mechanism 3 is disposed between the input member 2 and the differential gear device 4 on the transmission path of the driving force. The counter gear mechanism 3 rotates about the second axis A2 that is different from the first axis A1 about which the rotary electric machine 1 and the input member 2 rotate. That is, the counter gear mechanism 3 is disposed on the second axis A2 that is different from the first axis A1. The counter gear mechanism 3 includes a counter shaft 31, a first gear 32 that meshes with the drive gear 22 included in the input member 2, and a second gear 33 that meshes with a differential input gear 41 of the differential gear device 4.

The counter shaft 31 extends in the axial direction L. An axial first-side-L1 end of the counter shaft 31 is rotatably supported by the first side wall portion 52 of the case 5 via a first counter bearing 95. An axial second-side-L2 end of the counter shaft 31 is rotatably supported by the support member 7 via a second counter bearing 96. Since the counter shaft 31 is rotatably supported by the first side wall portion 52 and the support member 7 in the manner described above, an axial first-side-L1 end of the counter gear mechanism 3 is rotatably supported by the first side wall portion 52, and an axial second-side-L2 end of the counter gear mechanism 3 is rotatably supported by the support member 7.

The first gear 32 is an input element of the counter gear mechanism 3. The first gear 32 meshes with the drive gear 22 of the input member 2. The first gear 32 is disposed on the counter shaft 31 so as to rotate together with the counter shaft 31. In the present embodiment, the first gear 32 is coupled to the counter shaft 31 by spline engagement so as to rotate together with the counter shaft 31. The first gear 32 is disposed between the first counter bearing 95 and the second counter bearing 96, and on the axial second side L2 with respect to the second gear 33. In the present embodiment, the first gear 32 is disposed adjacent to the axial first side L1 of the second counter bearing 96.

The second gear 33 is an output element of the counter gear mechanism 3. The second gear 33 meshes with the differential input gear 41 of the differential gear device 4 described below. In the present embodiment, the second gear 33 is formed to have a smaller diameter than the first gear 32. The second gear 33 is disposed on the counter shaft 31 so as to rotate together with the counter shaft 31. In the present embodiment, the second gear 33 is formed integrally with the counter shaft 31. The second gear 33 is disposed coaxially with the first gear 32. Moreover, the second gear 33 is disposed between the first counter bearing 95 and the second counter bearing 96, and on the axial first side L1 with respect to the first gear 32. In the present embodiment, the second gear 33 is disposed adjacent to the axial second side L2 of the first counter bearing 95.

The differential gear device 4 distributes the driving force transmitted from the rotary electric machine 1 via the input member 2 and the counter gear mechanism 3, to each of the first wheel and the second wheel via a first drive shaft DS1 and a second drive shaft DS2. The differential gear device 4 includes the differential input gear 41, a differential case 42, a pinion shaft 43, a pair of pinion gears 44, a first side gear 45, and a second side gear 46. In the present embodiment, the pair of pinion gears 44, the first side gear 45, and the second side gear 46 are all bevel gears. That is, the differential gear device 4 is a bevel gear type differential gear device.

The differential input gear 41 is an input element of the differential gear device 4. The differential input gear 41 meshes with the second gear 33 of the counter gear mechanism 3. The differential input gear 41 rotates about the third axis A3 that is different from the first axis A1 about which the rotary electric machine 1 and the input member 2 rotate, and different from the second axis A2 about which the counter gear mechanism 3 rotates. The differential input gear 41 is coupled to the differential case 42 so as to rotate together with the differential case 42. The differential input gear 41 is disposed on the outermost side of the differential gear device 4 in the radial direction R.

The differential case 42 rotates about the third axis A3, together with the differential input gear 41. The differential case 42 is a hollow member that accommodates therein the pinion shaft 43, the pair of pinion gears 44, the first side gear 45, and the second side gear 46. The differential case 42 is disposed at a position overlapping the first gear 32 as viewed in the axial direction L. The first side gear 45 is coupled to the first drive shaft DS1 drivingly coupled to the first wheel. The second side gear 46 is coupled to the second drive shaft DS2 drivingly coupled to the second wheel. Note that the pair of pinion gears 44, the first side gear 45, and the second side gear 46 form a gear mechanism 47, and the differential case 42 accommodates the gear mechanism 47.

In the present embodiment, the expression "to overlap as viewed in a predetermined direction" used in connection with the arrangement of two members indicates that when a virtual line parallel to the viewing direction is moved in directions orthogonal to the virtual line, there is an area where the virtual line crosses both the two members.

An axial first-side-L1 end of the differential case 42 is rotatably supported by the first side wall portion 52 of the case 5 via a first differential bearing 97. An axial second-side-L2 end of the differential case 42 is rotatably supported by the support member 7 via a second differential bearing 98. Since the differential case 42 is rotatably supported by the first side wall portion 52 and the support member 7 in the manner described above, an axial first-side-L1 end of the differential gear device 4 is rotatably supported by the first side wall portion 52, and an axial second-side-L2 end of the differential gear device 4 is rotatably supported by the support member 7.

An axial second-side-L2 end of the first drive shaft DS1 is coupled to the first side gear 45. The first drive shaft DS1 is disposed on the third axis A3. The first drive shaft DS1 extends from the differential gear device 4 toward the axial first side L1, and extends through the first side wall portion 52 to the outside of the case 5.

An axial first-side-L1 end of an intermediate member 8 is coupled to the second side gear 46. The intermediate member 8 is disposed on the third axis A3. An axial second-side-L2 end of the intermediate member 8 is rotatably supported by the second side wall portion 53 via an intermediate bearing 99. The intermediate member 8 extends through a through-hole 71 formed in the support member 7 in the axial direction L. The axial first-side-L1 end of the intermediate member 8 is coupled to the differential gear device 4. Then, the intermediate member 8 is at least partially accommodated inside the case 5.

The axial second-side-L2 end of the intermediate member 8 is coupled to the second drive shaft DS2. In the present embodiment, the intermediate member 8 and the second drive shaft DS2 are formed integrally with each other. The second drive shaft DS2 extends through the second side wall portion 53 to the outside of the case 5.

In the differential gear device 4 having the configuration described above, the differential input gear 41 and the differential case 42 rotate about the third axis A3 as mentioned above. That is, the differential gear device 4 is disposed on the third axis A3 that is different from the first axis A1 and the second axis A2.

Hereinafter, the configuration of the case 5 will be described in detail.

As illustrated in FIG. 1, the case 5 includes the peripheral wall portion 51, the first side wall portion 52, and the second side wall portion 53. The peripheral wall portion 51 surrounds the outer side of the rotary electric machine 1, the input member 2, the counter gear mechanism 3, and the differential gear device 4 in the radial direction R. The peripheral wall portion 51 (peripheral wall) is formed in a tube-like shape extending in the axial direction L. The first side wall portion 52 covers the axial first side L1 of the input member 2, the counter gear mechanism 3, and the differential gear device 4, and is disposed on the axial first side L1 with respect to the peripheral wall portion 51. The first side wall portion 52 is formed in a plate-like shape extending in the radial direction R. The second side wall portion 53 covers the axial second side L2 of the rotary electric machine 1, and is disposed on the axial second side L2 with respect to the peripheral wall portion 51. The second side wall portion 53 is formed in a plate-like shape extending in the radial direction R.

The peripheral wall portion 51 includes a first peripheral wall portion 511 (first peripheral wall), and a second peripheral wall portion 512 (second peripheral wall) joined to the first peripheral wall portion 511 from the axial second side L2. In the present embodiment, the first peripheral wall portion 511 and the first side wall portion 52 are formed integrally with each other, and the second peripheral wall portion 512 and the second side wall portion 53 are formed integrally with each other. That is, the case 5 is formed of two case portions, namely, a first case portion formed of the first peripheral wall portion 511 and the first side wall portion 52, and a second case portion formed of the second peripheral wall portion 512 and the second side wall portion 53.

A first boss B1 projecting outward in the radial direction R from the main body of the first peripheral wall portion 511 is formed at an axial second-side-L2 end of the first peripheral wall portion 511. A second boss B2 projecting outward in the radial direction R from the main body of the second peripheral wall portion 512 is formed at an axial first-side-L1 end of the second peripheral wall portion 512. The first peripheral wall portion 511 and the second peripheral wall portion 512 are joined to each other, with the first boss B1 and the second boss B2 fastened by a fastening member such as a bolt. A seal member (not illustrated) for preventing oil leakage from the inner side of the first peripheral wall portion 511 and the second peripheral wall portion 512 is provided between the first boss B1 of the first peripheral wall portion 511 and the second boss B2 of the second peripheral wall portion 512. Preferable examples of the seal member include liquid gasket.

The first peripheral wall portion 511 and the second peripheral wall portion 512 are joined to each other, on the axial first side L1 with respect to the center of the case 5 in the axial direction L. In the present embodiment, the joining portion between the first peripheral wall portion 511 and the second peripheral wall portion 512 is disposed on the axial first side L1 with respect to the support member 7. Further, in the present embodiment, the joining portion between the first peripheral wall portion 511 and the second peripheral wall portion 512 is disposed at a position overlapping each of the input member 2, the counter gear mechanism 3, and the differential input gear 41, as viewed in the radial direction R with reference to the third axis A3.

The first side wall portion 52 supports the first input bearing 93 as a bearing that supports the axial first-side-L1 end of the input member 2, the first counter bearing 95 as a bearing that supports the axial first-side-L1 end of the counter gear mechanism 3, and the first differential bearing 97 as a bearing that supports the axial first-side-L1 end of the differential gear device 4. The first input bearing 93, the first counter bearing 95, and the first differential bearing 97 are disposed at positions overlapping each other as viewed in the radial directions R with reference to the respective axes A1 to A3.

A third boss B3 projecting inward in the radial direction R from the main body of the second peripheral wall portion 512 is formed on the second peripheral wall portion 512. The second peripheral wall portion 512 has an inner peripheral surface including the third boss B3 and formed in a shape such that its diameter increases toward the axial first side L1. In the present embodiment, the inner peripheral surface of the second peripheral wall portion 512 is formed in a shape such that its diameter increases toward the axial first side L1 stepwise. In the present embodiment, the third boss B3 is a part of the second peripheral wall portion 512. The third boss B3 may be formed on a projecting portion projecting inward in the radial direction R from the second peripheral wall portion 512. In this case, the projecting portion may be formed integrally with the second peripheral wall portion 512, or may be a separate member from the second peripheral wall portion 512. The support member 7 and the third boss B3 are fixed by a fastening member such as a bolt, so that the support member 7 is fixed inside the second peripheral wall portion 512 of the case 5.

The support member 7 supports the second input bearing 94 as a bearing that supports the axial second-side-L2 end of the input member 2, the second counter bearing 96 as a bearing that supports the axial second-side-L2 end of the counter gear mechanism 3, the second differential bearing 98 as a bearing that supports the axial second-side-L2 end of the differential gear device 4. The second input bearing 94, the second counter bearing 96, and the second differential bearing 98 are disposed at positions overlapping each other as viewed in the radial directions R with reference to the respective axes A1 to A3. The support member 7 supports the first rotor bearing 91 as a bearing that supports the axial first side L1 of the rotary electric machine 1. The first rotor bearing 91 is disposed on the axial second side L2 with respect to the second input bearing 94, the second counter bearing 96, and the second differential bearing 98.

A terminal block 16 for a power line 15 connected to the rotary electric machine 1 is attached to the second peripheral wall portion 512. The power line 15 has one end connected to the coil 112 of the stator 11 of the rotary electric machine 1, and extends to the axial first side L1 from the rotary electric machine 1. A distal end (another end) of the power line 15 extending from the rotary electric machine 1 is connected to the terminal block 16. In this example, the power line 15 extends through an opening of the support member 7 to the axial first side L1 beyond the support member 7. The terminal block 16 is disposed on the axial first side L1 with respect to the rotary electric machine 1 and the support member 7, and on the axial second side L2 with respect to the axial first-side-L1 end of the second peripheral wall portion 512. The terminal block 16 is attached to the second peripheral wall portion 512 so as to extend through the second peripheral wall portion 512 in the radial direction R. Then, the second peripheral wall portion 512 is joined to the first peripheral wall portion 511, on the axial first side L1 with respect to the terminal block 16.

The vehicle drive device 100 includes a rotation sensor 17 for detecting a rotation of the rotary electric machine 1. The rotation sensor 17 is disposed between the support member 7 and the rotary electric machine 1 in the axial direction L, and is supported by the support member 7. The rotation sensor 17 is a sensor for detecting the position of the rotor 12 with respect to the stator 11 of the rotary electric machine 1 in the rotational direction. Examples of the rotation sensor 17 include a resolver. A harness (not illustrated) has one end connected to the terminal block 16, and another end connected to the rotation sensor 17, so that the rotation sensor 17 is connected to the terminal block 16 by the harness (not illustrated).

2. Other Embodiments

Hereinafter, other embodiments of a vehicle drive device will be described.

(1) In the above embodiment, the second peripheral wall portion 512 is joined to the first peripheral wall portion 511 at a position overlapping the differential input gear 41 as viewed in the radial direction R with reference to the third axis A3. However, the position where the second peripheral wall portion 512 is joined to the first peripheral wall portion 511 may be appropriately changed. That is, the second peripheral wall portion 512 may be jointed to the first peripheral wall portion 511, on the axial first side L1 with respect to the differential input gear 41, or may be joined to the first peripheral wall portion 511, on the axial second side L2 with respect to the differential input gear 41.

(2) In the above embodiment, the first peripheral wall portion 511 and the first side wall portion 52 are formed integrally with each other. However, the first peripheral wall portion 511 and the first side wall portion 52 may be formed separately from each other, and the first side wall portion 52 may be joined to the first peripheral wall portion 511 from the axial first side L1. Further, the second peripheral wall portion 512 and the second side wall portion 53 are formed integrally with each other. However, the second peripheral wall portion 512 and the second side wall portion 53 may be formed separately from each other, and the second side wall portion 53 may be joined to the second peripheral wall portion 512 from the axial second side L2.

(3) In the present embodiment, the second input bearing 94, the second counter bearing 96, and the second differential bearing 98 are disposed at positions overlapping each other as viewed in the radial directions R with reference to the respective axes A1 to A3. However, only two of the second input bearing 94, the second counter bearing 96, and the second differential bearing 98 may be disposed at positions overlapping each other as viewed in the radial directions R with reference to the respective axes A1 to A3. Alternatively, the second input bearing 94, the second counter bearing 96, and the second differential bearing 98 may be disposed so as not to overlap each other as viewed in the radial directions R with reference to the respective axes A1 to A3.

(4) In the above embodiment, the support member 7 is fixed to the second peripheral wall portion 512 or a portion formed integrally with the second peripheral wall portion 512. However, the support member 7 may be fixed to the first peripheral wall portion 511 or a portion formed integrally with the first peripheral wall portion 511.

(5) In the above embodiment, the terminal block 16 is attached to the second peripheral wall portion 512. However, the position where the terminal block 16 is attached may be appropriately changed. For example, the terminal block 16 may be attached to the first peripheral wall portion 511. In the case where the terminal block 16 is attached to the first peripheral wall portion 511, the first peripheral wall portion 511 and the second peripheral wall portion 512 may be joined to each other, on the axial second side L2 with respect to the terminal block 16.

(6) In the above embodiment, the second peripheral wall portion 512 has an inner peripheral surface formed in a shape such that its diameter increases toward the axial first side L1. However, the shape of the inner peripheral wall of the second peripheral wall portion 512 may be appropriately changed.

(7) In the above embodiment, the axial second-side end of the differential gear device is supported by the support member. However, the axial second-side end of the differential gear device may be supported by the second side wall portion.

(8) The configurations disclosed in each of the above embodiments may be applied in combination with the configurations disclosed in the other embodiments as long as no inconsistency arises. Regarding other configurations as well, the embodiments disclosed herein are merely examples in all respects. Accordingly, various modifications may be appropriately made without departing from the scope and spirit of the present disclosure.

3. Summary of Embodiments

The following provides a summary of the vehicle drive device described above.

A vehicle drive device includes: a rotary electric machine (1) that serves as a drive power source for a plurality of wheels; an input member (2) drivingly coupled to the rotary electric machine (1); a counter gear mechanism (3); a differential gear device (4) that distributes a driving force transmitted from the rotary electric machine (1) via the input member (2) and the counter gear mechanism (3), to the plurality of wheels; a case (5) that accommodates the rotary electric machine (1), the input member (2), the counter gear mechanism (3), and the differential gear device (4); and a support member (7) that is a separate member from the case (5), and is fixed inside the case (5); wherein the rotary electric machine (1) and the input member (2) are disposed on a first axis (A1); wherein the counter gear mechanism (3) is disposed on a second axis (A2) different from the first axis (A1); wherein the differential gear device (4) is disposed on a third axis (A3) that is different from the first axis (A1) and the second axis (A2); wherein a side on which the input member (2) is disposed with respect to the rotary electric machine (1) in an axial direction (L) is defined as an axial first side (L1), and a side opposite to the axial first side (L1) is defined as an axial second side (L2); wherein the case (5) includes a tube-like peripheral wall portion (51) surrounding an outer side of the rotary electric machine (1), the input member (2), the counter gear mechanism (3), and the differential gear device (4) in a radial direction (R), a first side wall portion (52) disposed on the axial first side (L1) with respect to the peripheral wall portion (51), and a second side wall portion (53) disposed on the axial second side (L2) with respect to the peripheral wall portion (51); wherein the peripheral wall portion (51) includes a first peripheral wall portion (511), and a second peripheral wall portion (512) joined to the first peripheral wall portion (511) from the axial second side (L2); and wherein an axial first-side (L1) end of the counter gear mechanism (3) is supported by the first side wall portion (52), and an axial second-side (L2) end of the counter gear mechanism (3) is supported by the support member (7).

With this configuration, since the support member (7) for supporting an end of the counter gear mechanism (3) is provided, and since the support member (7) is fixed inside the case (5), it is possible to minimize the number of parts into which the peripheral wall portion (51) of the case (5) is divided. Accordingly, it is possible to minimize the number of bosses (B1, B2) for joining the peripheral wall portions (51), and the number of seal members for preventing oil leakage from the inner side of the peripheral wall portions (51). As the number of bosses (B1, B2) is reduced, the number of portions projecting radially outward can be reduced. Therefore, the size of the case (5) can be reduced, and the configuration of the case (5) can be simplified, which allows a reduction in production costs. A reduction in the number of seal members also allows a reduction in production costs. Accordingly, this configuration allows a reduction in the size of the case (5) and a reduction in production costs.

An axial first-side (L1) end of the differential gear device (4) is preferably supported by the first side wall portion (52), and an axial second-side (L2) end of the differential gear device (4) is preferably supported by the support member (7).

With this configuration, the support interval of the differential gear device (4) can be reduced compared to the case where the axial first-side (L1) end of the differential gear device (4) is supported by the first side wall portion (52), and the axial second-side (L2) end of the differential gear device (4) is supported by the second side wall portion.

Preferably, the vehicle drive device further includes an intermediate member (8) that is disposed on the third axis (A3) to be coupled to the differential gear device (4), and that is at least partially accommodated inside the case (5), and the intermediate member (8) extends through a through-hole (71) formed in the support member (7) in the axial direction (L).

With this configuration, the driving force from the differential gear device (4) can be transmitted to the axial second side (L2) by the intermediate member (8). Therefore, compared to the case where the intermediate member (8) is not provided, the arrangement position of the differential gear device (4) can be shifted toward the axial first side (L1). Thus, the differential gear device (4) can easily be disposed so as not to overlap the rotary electric machine (1) as viewed in the radial direction (R), and hence the third axis (A3) of the differential gear device (4) and the first axis (A1) of the rotary electric machine (1) can easily be disposed closer to each other. This allows a further reduction in the size of the case (5).

Further, the differential gear device (4) preferably includes a differential case (42) that accommodates a gear mechanism (47), and a differential input gear (41) coupled to the differential case (42); the counter gear mechanism (3) preferably includes a first gear (32) that meshes with a drive gear (22) included in the input member (2), and a second gear (33) that has a smaller diameter than the first gear (32), and that meshes with the differential input gear (41); and the differential case (42) is preferably disposed at a position overlapping the first gear (32) as viewed in the axial direction (L).

With this configuration, compared to the case where the differential case (42) is disposed so as not to overlap the first gear (32) of the counter gear mechanism (3) as viewed in the axial direction (L), the second axis (A2) of the counter gear mechanism (3) and the third axis (A3) of the differential gear device (4) can be disposed closer to each other. This allows a further reduction in the size of the case (5).

Further, the differential gear device (4) preferably includes a differential input gear (41) disposed on an outermost side of the differential gear device (4) in a radial direction (R) of the differential gear device (4), and the second peripheral wall portion (512) preferably has an inner peripheral surface formed in a shape such that a diameter of the inner peripheral surface increases toward the axial first side (L1), and is joined to the first peripheral wall portion (511) at a position overlapping the differential input gear (41) as viewed in a radial direction (R) with reference to the third axis (A3).

With this configuration, since the inner peripheral surface of the second peripheral wall portion (512) is formed in a shape such that a diameter of the inner peripheral surface increases toward the axial first side (L1), the differential input gear (41) is disposed in an increased diameter portion of the second peripheral wall portion (512), thereby reducing the wasted space in the case (5). This allows a further reduction in the size of the case (5).

Further, an axial first-side (L1) end of the rotary member (14) of the rotary electric machine (1) and an axial second-side (L2) end of the input member (2) are preferably supported by the support member (7).

With this configuration, since the support member (7) is used as a member for supporting the axial first side (L1) of the rotary electric machine (1) and the axial second side (L2) of the input member (2), there is no need to provide a dedicated member for supporting the axial first side (L1) of the rotary electric machine (1) and the axial second side (L2) of the input member (2). This allows a simplification of the configuration of the vehicle drive device, and a further reduction in the size of the case (5).

Further, the first peripheral wall portion (511) and the first side wall portion (52) are preferably formed integrally with each other, and the second peripheral wall portion (512) and the second side wall portion (53) are preferably formed integrally with each other.

With this configuration, there is no need to join the first peripheral wall portion (511) and the first side wall portion (52) to each other, and there is no need to join the second peripheral wall portion (512) and the second side wall portion (53) to each other. Accordingly, compared to the case where these components are configured to be joined, the number of bosses and seal members in the case (5) can be reduced. This allows a reduction in the size of the case (5) and a reduction in production costs.

Further, a bearing (92) that supports the axial second-side (L2) end of the input member (2), a bearing (94) that supports the axial second-side (L2) end of the counter gear mechanism (3), and a bearing (96) that supports the axial second-side (L2) end of the differential gear device (4) are preferably disposed at positions overlapping each other as viewed in radial directions (R) with reference to the respective axes.

With this configuration, the plurality of bearings (92, 94, 96) disposed on the different axes can be disposed in a small area in the axial direction (L). This makes it easy to reduce the size of the case (5) in the axial direction (L).

Further, the support member (7) is preferably fixed to the second peripheral wall portion (512) of the case (5) or a portion formed integrally with the second peripheral wall portion (512).

With this configuration, the support member (7) can be appropriately fixed inside the case (5).

Further, the vehicle drive device preferably further includes a power line (15) having an axial first-side (L1) end connected to a terminal block (16), and an axial second-side (L2) end connected to the axial first side (L1) of the rotary electric machine (1).

With this configuration, in the case where the rotary electric machine (1) is mounted on the inner side of the second peripheral wall portion (512) from the axial first side (L1), the power line (15) can easily be connected to the rotary electric machine (1) from the axial first side (L1) after the rotary electric machine (1) is mounted.

Further, the terminal block (16) is preferably attached to the second peripheral wall portion (512), on the axial first side (L1) with respect to the rotary electric machine (1), and the second peripheral wall portion (512) is preferably joined to the first peripheral wall portion (511), on the axial first side (L1) with respect to the terminal block (16).

With this configuration, in the case where the rotary electric machine (1) is accommodated on the second peripheral wall portion (512) side, the work for connecting the power line (15) having been connected to the rotary electric machine (1) to the terminal block (16) can easily be performed, before joining the first peripheral wall portion (511) and the second peripheral wall portion (512) to each other. Therefore, there is no need to separately provide an opening or the like in the case (5) for this connection work. This allows a further reduction in the size of the case (5).

Further, the vehicle drive device preferably further includes a resolver (17) fixed to the support member.

With this configuration, in the case where the rotary electric machine (1) is mounted on the inner side of the second peripheral wall portion (512) from the axial first side (L1), mounting of the resolver (17) and connection of the harness can easily be performed after the rotary electric machine (1) is mounted.

Further, an internal space of the case (5) is preferably divided by the support member (7) in the axial direction (L); the input member (2), the counter gear mechanism (3), and the differential gear device (4) are preferably disposed in a space between the first side wall portion (52) and the support member (7); and the rotary electric machine (1) is preferably disposed in a space between the second side wall portion (53) and the support member (7).

With this configuration, the input member (2), the counter gear mechanism (3), and the differential gear device (4) can be appropriately supported from both sides in the axial direction (L) by the first side wall portion (52) and the support member (7), and the rotary electric machine (1) can be appropriately supported from both sides in the axial direction (L) by the second side wall portion (53) and the support member (7). Moreover, since the input member (2), the counter gear mechanism (3), and the differential gear device (4) are all disposed in the space between the first side wall portion (52) and the support member (7), the input member (2), the counter gear mechanism (3), and the differential gear device (4) can easily be arranged so as to overlap in the axial direction (L). This makes it possible to appropriately implement a configuration for performing power transmission by these components.

Further, a joining portion between the first peripheral wall portion (511) and the second peripheral wall portion (512) is preferably disposed on the axial first side (L1) with respect to the support member (7).

With this configuration, even when the counter gear mechanism (3) is disposed on the inner side of the peripheral wall portion (51) of the case (5), and the axial second-side (L2) end of the counter gear mechanism (3) is supported by the support member (7), the first peripheral wall portion (511) and the second peripheral wall portion (512) can easily be joined to each other.

INDUSTRIAL APPLICABILITY

The technique of the present disclosure is applicable to a vehicle drive device including a rotary electric machine, an input member, a counter gear mechanism, a differential gear device, and a case accommodating these components.

The invention claimed is:
1. A vehicle drive device comprising:
a rotary electric machine that serves as a drive power source for a plurality of wheels;
an input drivingly coupled to the rotary electric machine;
a counter gear mechanism;
a differential gear device that distributes a driving force transmitted from the rotary electric machine via the input and the counter gear mechanism, to the plurality of wheels;
a case that accommodates the rotary electric machine, the input, the counter gear mechanism, and the differential gear device; and
a support that is a separate member from the case, and is fixed inside the case;
wherein the rotary electric machine and the input are disposed on a first axis;
wherein the counter gear mechanism is disposed on a second axis different from the first axis;
wherein the differential gear device is disposed on a third axis that is different from the first axis and the second axis;
wherein a side on which the input is disposed with respect to the rotary electric machine in an axial direction is defined as an axial first side, and a side opposite to the axial first side is defined as an axial second side;
wherein the case includes a tube peripheral wall surrounding an outer side of the rotary electric machine, the input, the counter gear mechanism, and the differential gear device in a radial direction, a first side wall disposed on the axial first side with respect to the peripheral wall, and a second side wall disposed on the axial second side with respect to the peripheral wall;
wherein the peripheral wall includes a first peripheral wall, and a second peripheral wall joined to the first peripheral wall from the axial second side;
wherein an axial first-side end of the counter gear mechanism is supported by the first side wall, and an axial second-side end of the counter gear mechanism is supported by the support;
wherein the first peripheral wall and the first side wall are formed integrally with each other; and
wherein the second peripheral wall and the second side wall are formed integrally with each other.
2. The vehicle drive device according to claim 1, wherein an axial first-side end of the differential gear device is supported by the first side wall, and an axial second-side end of the differential gear device is supported by the support.

3. The vehicle drive device according to claim 2, further comprising:
an intermediate member that is disposed on the third axis to be coupled to the differential gear device, and is at least partially accommodated inside the case;
wherein the intermediate member extends through a through-hole formed in the support in the axial direction.

4. The vehicle drive device according to claim 3,
wherein the differential gear device includes a differential case that accommodates a gear mechanism, and a differential input gear coupled to the differential case;
wherein the counter gear mechanism includes a first gear that meshes with a drive gear included in the input, and a second gear that has a smaller diameter than the first gear, and that meshes with the differential input gear; and
wherein the differential case is disposed at a position overlapping the first gear as viewed in the axial direction.

5. The vehicle drive device according to claim 4,
wherein the differential gear device includes a differential input gear disposed on an outermost side of the differential gear device in a radial direction of the differential gear device; and
wherein the second peripheral wall has an inner peripheral surface formed in a shape such that a diameter of the inner peripheral surface increases toward the axial first side, and is joined to the first peripheral wall at a position overlapping the differential input gear as viewed in a radial direction with reference to the third axis.

6. The vehicle drive device according to claim 5, wherein an axial first-side end of a rotary member of the rotary electric machine and an axial second-side end of the input are supported by the support.

7. The vehicle drive device according to claim 6, wherein a bearing that supports an axial second-side end of the input, a bearing that supports the axial second-side end of the counter gear mechanism, and a bearing that supports an axial second-side end of the differential gear device are disposed at positions overlapping each other as viewed in radial directions with reference to the respective axes.

8. The vehicle drive device according to claim 7, wherein the support is fixed to the second peripheral wall of the case or a portion formed integrally with the second peripheral wall.

9. The vehicle drive device according to claim 8, further comprising:
a power line having an axial first-side end connected to a terminal block, and an axial second-side end connected to the axial first side of the rotary electric machine.

10. The vehicle drive device according to claim 9,
wherein the terminal block is attached to the second peripheral wall, on the axial first side with respect to the rotary electric machine; and
the second peripheral wall is joined to the first peripheral wall, on the axial first side with respect to the terminal block.

11. The vehicle drive device according to claim 9, further comprising:
a resolver fixed to the support.

12. The vehicle drive device according to claim 11,
wherein an internal space of the case is divided by the support in the axial direction;
wherein the input, the counter gear mechanism, and the differential gear device are disposed in a space between the first side wall and the support; and
wherein the rotary electric machine is disposed in a space between the second side wall and the support.

13. The vehicle drive device according to claim 12, wherein a joint between the first peripheral wall and the second peripheral wall is disposed on the axial first side with respect to the support.

14. The vehicle drive device according to claim 1, further comprising:
an intermediate member that is disposed on the third axis to be coupled to the differential gear device, and is at least partially accommodated inside the case;
wherein the intermediate member extends through a through-hole formed in the support in the axial direction.

15. The vehicle drive device according to claim 1,
wherein the differential gear device includes a differential input gear disposed on an outermost side of the differential gear device in a radial direction of the differential gear device; and
wherein the second peripheral wall has an inner peripheral surface formed in a shape such that a diameter of the inner peripheral surface increases toward the axial first side, and is joined to the first peripheral wall at a position overlapping the differential input gear as viewed in a radial direction with reference to the third axis.

16. The vehicle drive device according to claim 1, wherein an axial first-side end of a rotary member of the rotary electric machine and an axial second-side end of the input are supported by the support.

17. The vehicle drive device according to claim 1, wherein a bearing that supports an axial second-side end of the input, a bearing that supports the axial second-side end of the counter gear mechanism, and a bearing that supports an axial second-side end of the differential gear device are disposed at positions overlapping each other as viewed in radial directions with reference to the respective axes.

18. The vehicle drive device according to claim 1, wherein the support is fixed to the second peripheral wall of the case or a portion formed integrally with the second peripheral wall.

* * * * *